(12) United States Patent
Shen et al.

(10) Patent No.: US 12,342,195 B2
(45) Date of Patent: Jun. 24, 2025

(54) METHOD AND APPARATUS FOR DETERMINING EVALUATION TIME FOR DOWNLINK TRANSMISSION QUALITY MONITORING

(71) Applicant: HUAWEI TECHNOLOGIES CO., LTD., Guangdong (CN)

(72) Inventors: Zhongyi Shen, Beijing (CN); Jing Han, Beijing (CN); Li Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 17/856,627

(22) Filed: Jul. 1, 2022

(65) Prior Publication Data

US 2022/0338044 A1    Oct. 20, 2022

Related U.S. Application Data

(63) Continuation of application No. PCT/CN2020/070321, filed on Jan. 3, 2020.

(51) Int. Cl.
*H04W 24/08* (2009.01)
(52) U.S. Cl.
CPC ................... *H04W 24/08* (2013.01)
(58) Field of Classification Search
CPC ..... H04W 24/08; H04L 5/0064; H04L 5/0048
See application file for complete search history.

(56) References Cited

U.S. PATENT DOCUMENTS

2015/0289141 A1* 10/2015 Ghasemzadeh ... H04W 72/0446
                                                        370/330
2017/0311316 A1* 10/2017 Chendamarai Kannan ................
                                                  H04W 72/0446
(Continued)

FOREIGN PATENT DOCUMENTS

CN    109076443 A    12/2018
CN    109845383 A     6/2019
(Continued)

OTHER PUBLICATIONS

International Search Report (ISR) for PCT/CN2020/070321 (English translation), mailed Aug. 31, 2020 (Year: 2020).*
(Continued)

*Primary Examiner* — Benjamin H Elliott, IV
(74) *Attorney, Agent, or Firm* — Fish & Richardson P.C.

(57) ABSTRACT

This application relates to the field of communication technologies, and discloses methods and apparatuses for determining evaluation time for downlink transmission quality monitoring, to dynamically determine evaluation time for downlink transmission quality monitoring based on a quantity of available reference signals and an expected quantity of available reference signals in the evaluation time. An example method includes: receiving first indication information from a network device, where the first indication information indicates channel occupancy time of the network device; determining a first quantity based on the first indication information, where the first quantity is a quantity of available reference signals in first evaluation time; and determining the first evaluation time based on the first quantity and a second quantity, where the second quantity is an expected quantity of available reference signals in the first evaluation time.

20 Claims, 5 Drawing Sheets

(56) References Cited

U.S. PATENT DOCUMENTS

| | | | |
|---|---|---|---|
| 2019/0268199 A1* | 8/2019 | Shi | H04L 5/0051 |
| 2019/0310891 A1* | 10/2019 | Baldasaro | G06F 9/542 |
| 2019/0349797 A1* | 11/2019 | Lin | H04W 24/10 |
| 2020/0146063 A1* | 5/2020 | Xu | H04W 24/08 |
| 2020/0195479 A1* | 6/2020 | Shi | H04L 1/0026 |
| 2021/0136821 A1* | 5/2021 | Tang | H04W 74/0808 |
| 2021/0243808 A1* | 8/2021 | Deenoo | H04B 17/309 |
| 2021/0251001 A1* | 8/2021 | Wu | H04L 5/0048 |
| 2022/0078873 A1* | 3/2022 | Belleschi | H04W 28/24 |
| 2022/0086740 A1* | 3/2022 | Li | H04B 7/0695 |
| 2022/0104147 A1* | 3/2022 | Cui | H04W 52/243 |
| 2022/0110181 A1* | 4/2022 | Miao | H04L 1/1822 |
| 2022/0167397 A1* | 5/2022 | Thangarasa | H04W 74/08 |
| 2022/0201519 A1* | 6/2022 | Huang | H04W 24/08 |
| 2022/0338044 A1* | 10/2022 | Shen | H04W 24/08 |
| 2022/0376863 A1* | 11/2022 | Da Silva | H04B 7/0626 |

FOREIGN PATENT DOCUMENTS

| | | | |
|---|---|---|---|
| WO | 2019097432 A1 | 5/2019 | |
| WO | 2019241936 A1 | 12/2019 | |
| WO | 2019246084 A1 | 12/2019 | |

OTHER PUBLICATIONS

International Search Report (ISR) for PCT/CN2020/070321 (English translation), extended Report, mailed Aug. 31, 2020 (Year: 2020).*

"Evaluation Periods for RLM, BFD and CBD in NR-U"; Qualcomm; 3GPP TSG-RAN WG4 Meeting #92 R4-1909608 Ljubljana, Slovenia, Aug. 26-30, 2019 (Year: 2019).*

"Discussion on NR-U RLM requirements"; Intel; 3GPP TSG-RAN WG4 Meeting #92-Bis R4-1911034 Chongqing, China, Oct. 14-18, 2019 (Year: 2019).*

"Discussion on RLM in NR-U"; Huawei et al.; 3GPP TSG-RAN WG4 Meeting #92bis R4-1911930 Chongqing, China, Oct. 14-18, 2019 (Year: 2019).*

"On RLM for NR-U"; Ericsson; 3GPP TSG-RAN WG4 Meeting #92-Bis R4-1912087 Chongqing, P. R. of China, Oct. 14-18, 2019 (Year: 2019).*

"Evaluation Periods for RLM in NR-U"; Qualcomm; 3GPP TSG-RAN WG4 Meeting #92bis R4-1912551 Chongqing, China Oct. 14-18, 2019 (Year: 2019).*

Nokia et al., "Discussion on RLM in NR-U," 3GPP TSG-RAN WG4 Meeting #93, R4-1914176, Reno, USA, Nov. 18-22, 2019, 7 pages.

Mediatek Inc., "Discussion on RLM requirement for NR-U," 3GPP TSG-RAN WG4 Meeting #93, R4-1914077, Reno, USA, Nov. 18-22, 2019, 6 pages.

PCT International Search Report and Written Opinion issued in International Application No. PCT/CN2020/070321 on Aug. 31, 2020, 15 pages (with English translation).

Qualcomm Incorporated, "RLM and Link Recovery Procedure in NR-U," 3GPP TSG-RAN WG4 Meeting #93, R4-1914989, Reno, USA, Nov. 18-22, 2019, 5 pages.

Extended European Search Report issued in European Application No. 20910262.3 on Nov. 10, 2022, 9 pages.

Nokia et al., "RLM/RLF Measurement on NR-U," 3GPP TSG-RAN WG2 Meeting #102, R2-1807126, Busan, South Korea, May 21-25, 2018, 3 pages.

* cited by examiner

METHOD AND APPARATUS FOR DETERMINING EVALUATION TIME FOR DOWNLINK TRANSMISSION QUALITY MONITORING

CROSS-REFERENCE TO RELATED APPLICATIONS

This application is a continuation of International Application No. PCT/CN2020/070321, filed on Jan. 3, 2020, the disclosure of which is hereby incorporated by reference in its entirety.

TECHNICAL FIELD

This application relates to the field of communication technologies, and in particular, to a method and an apparatus for determining evaluation time for downlink transmission quality monitoring.

BACKGROUND

Radio link monitoring (RLM) and beam failure detection (BFD) are important parts of downlink transmission quality monitoring, and are important functions for supporting mobility of a terminal device. A terminal device in a radio resource control (RRC) connected state may continuously evaluate a downlink/beam quality based on a signal-to-noise ratio (SNR) detection result of a reference signal (RS). For example, when a signal-to-noise ratio detection result of a reference signal in a time period is less than an out-of-synchronization threshold ($Q_{out}$) after being filtered, an out-of-synchronization (out-of-sync) signal is triggered.

To ensure precision of downlink/beam quality monitoring and prevent the out-of-synchronization signal from being frequently triggered, the terminal device needs to set evaluation time for the downlink/beam quality monitoring, that is, out-of-synchronization evaluation. However, in new radio (NR) in unlicensed spectrum (NR-U), because an unlicensed spectrum is used, before sending a reference signal, a network device needs to perform clear channel assessment (CCA)/listen before talk (LBT). The network device may send the reference signal in specified channel occupancy time (COT) only after the CCA/LBT succeeds. If the CCA/LBT fails, the network device cannot send the reference signal. Consequently, during the downlink/beam quality monitoring, the terminal device cannot determine whether a low signal-to-noise ratio is caused by a poor channel condition or because the network device fails to perform CCA/LBT and does not send the reference signal.

Therefore, to ensure that the terminal device can obtain a sufficient quantity of reference signals to satisfy a precision requirement for out-of-synchronization evaluation, a possible solution is to perform fixed extension based on evaluation time in a licensed spectrum. However, in this case, even if the network device does not fail to perform CCA/LBT and successfully sends all the reference signals, the terminal device may also extend the evaluation time. Consequently, a delay is increased, and an unnecessary performance loss is caused to the terminal device.

SUMMARY

This application provides a method and an apparatus for determining evaluation time for downlink transmission quality monitoring, to satisfy an evaluation precision requirement for out-of-synchronization evaluation, and avoid problems of a delay increase and a performance loss caused by excessively long evaluation time.

According to a first aspect, this application provides a method for determining evaluation time for downlink transmission quality monitoring. The method includes: receiving first indication information from a network device, where the first indication information is used to indicate channel occupancy time of the network device; determining a first quantity based on the first indication information, where the first quantity is a quantity of available reference signals in first evaluation time; and determining the first evaluation time based on the first quantity and a second quantity, where the second quantity is an expected quantity of available reference signals in the first evaluation time, where the available reference signal satisfies at least one of the following: a moment of receiving the available reference signal is included in the channel occupancy time; a signal-to-noise ratio of the available reference signal is greater than a signal-to-noise ratio threshold; and a receive power of the available reference signal is greater than a receive power threshold.

The method for determining the evaluation time for the downlink transmission quality monitoring described in this application may be implemented by a terminal device, or may be implemented by a component such as a processing chip or a circuit in the terminal device. Based on the foregoing method, the terminal device dynamically determines the first evaluation time based on the quantity of available reference signals in the first evaluation time and the expected quantity of available reference signals in the first evaluation time, so that the quantity of available reference signals in the first evaluation time reaches the expected quantity of available reference signals in the first evaluation time, to satisfy a precision requirement for quality monitoring such as out-of-synchronization evaluation. In addition, a manner of dynamically determining the first evaluation time is used, to effectively avoid problems such as a delay increase and a performance loss caused because the first evaluation time is set excessively long.

In a possible design, the first evaluation time is determined based on a difference between the second quantity and the first quantity and an expansion factor, and the expansion factor is predefined or preconfigured.

In the foregoing design, the terminal device may determine the first evaluation time based on the difference between the second quantity and the first quantity and the expansion factor. For example, the terminal device may determine the first evaluation time based on $T_1=(N-n)*a+n$, where $T_1$ is a quantity of reference signals included in the first evaluation time, N is the second quantity, n is the first quantity, and a is the expansion factor. When the quantity of reference signals in the first evaluation time is less than $T_1$, the terminal device may extend the first evaluation time until the quantity of reference signals in the first evaluation time is greater than or equal to $T_1$. This helps satisfy a precision requirement for quality monitoring such as out-of-synchronization evaluation, and avoid problems such as a delay increase and a performance loss caused by the excessively long first evaluation time.

In a possible design, an initial value of the first evaluation time is initial first evaluation time, and the initial first evaluation time is predefined or preconfigured.

In the foregoing design, the terminal device may determine the first quantity based on a quantity of available reference signals in the initial first evaluation time. The first quantity does not change due to the extension of the first evaluation time, and the terminal device may directly determine the first evaluation time based on the difference between the second quantity and the first quantity and the expansion factor. For example, the terminal device directly determines the quantity of reference signals in the first evaluation time based on $T_1=(N-n)*a+n$, to determine the first evaluation time. This helps reduce computational complexity, and improve efficiency of determining the first evaluation time.

In a possible design, the first evaluation time is less than or equal to an evaluation time threshold ($N_{MAX}$), and the evaluation time threshold is predefined or preconfigured.

In the foregoing design, a maximum value of the first evaluation time may be limited by using the evaluation time threshold, to avoid problems of a delay increase and a performance loss caused by the excessively long first evaluation time.

In a possible design, the difference between the second quantity and the first quantity is less than or equal to a first threshold ($L_{MAX}$), or a product of the difference between the second quantity and the first quantity and the expansion factor is less than or equal to the first threshold ($L_{MAX}$), where the first threshold is predefined or preconfigured.

In the foregoing design, the difference between the second quantity and the first quantity or the product of the difference between the second quantity and the first quantity and the expansion factor may be limited by using the first threshold, to avoid a problem that the first evaluation time is excessively long.

In a possible design, the determining the first evaluation time based on the first quantity and a second quantity includes: extending the first evaluation time until the first quantity reaches the second quantity or the first evaluation time reaches an evaluation time threshold.

In the foregoing design, the terminal device may dynamically extend the first evaluation time based on whether the first quantity reaches the second quantity, to satisfy a precision requirement for quality monitoring such as out-of-synchronization evaluation, and may limit a maximum value of the first evaluation time by using the evaluation time threshold, to avoid problems of a delay increase and a performance loss caused by the excessively long first evaluation time.

In a possible design, the determining the first evaluation time based on the first quantity and a second quantity includes: extending the first evaluation time until the first quantity reaches the second quantity or time by which the first evaluation time is extended reaches an extended time threshold.

In the foregoing design, the terminal device may dynamically extend the first evaluation time based on whether the first quantity reaches the second quantity, to satisfy a precision requirement for quality monitoring such as out-of-synchronization evaluation, and may limit the extension of the first evaluation time by using the extended time threshold, to avoid problems of a delay increase and a performance loss caused by the excessively long first evaluation time.

In a possible design, the second quantity is a quantity of reference signals that corresponds to second evaluation time, and the second evaluation time is evaluation time for downlink transmission quality monitoring in a licensed spectrum.

In the foregoing design, the expected quantity of available reference signals in the first evaluation time in an unlicensed spectrum may be equal to the quantity of reference signals that corresponds to the second evaluation time in the licensed spectrum. This helps the terminal device quickly determine the first evaluation time.

In a possible design, the method further includes: determining the first evaluation time based on a quantity of available discontinuous reception periodicities, where all reference signals in the available discontinuous reception periodicity are available reference signals.

In the foregoing design, the first evaluation time may alternatively be determined based on the quantity of available discontinuous reception periodicities. To be specific, the first quantity may alternatively be a quantity of available discontinuous reception periodicities in the first evaluation time, and the second quantity may alternatively be an expected quantity of available discontinuous reception periodicities in the first evaluation time. The second quantity may alternatively be a quantity of available discontinuous reception periodicities that corresponds to the second evaluation time in the licensed spectrum. This helps extend an application scope of the method for determining evaluation time for downlink transmission quality monitoring, and satisfies requirements of a plurality of communication scenarios.

According to a second aspect, this application provides an apparatus for determining evaluation time for downlink transmission quality monitoring, where the apparatus for determining evaluation time for downlink transmission quality monitoring is configured to perform the method in any one of the first aspect or the possible designs. Specifically, the apparatus for determining evaluation time for downlink transmission quality monitoring may include a unit (module) configured to perform the method in any one of the first aspect or the possible designs, for example, include a processing unit and a transceiver unit. For example, the transceiver unit may include a sending unit and a receiving unit. The sending unit and the receiving unit may be different functional units, or may be a same functional unit that can implement different functions. For example, the apparatus for determining evaluation time for downlink transmission quality monitoring is a communication device, or a chip or another component disposed in the communication device. For example, the communication device is a terminal device. An example in which the apparatus for determining evaluation time for downlink transmission quality monitoring is a terminal device is used below. For example, the transceiver unit may alternatively be implemented as a transceiver, and the processing unit may alternatively be implemented as a processor. Alternatively, the sending unit may be implemented as a transmitter, and the receiving unit may be implemented as a receiver. The transmitter and the receiver may be different functional units, or may be a same functional unit that can implement different functions. If the apparatus for determining evaluation time for downlink transmission quality monitoring is the communication device, the transceiver is implemented as, for example, an antenna, a feeder, and a codec in the communication device. Alternatively, if the apparatus for determining evaluation time for downlink transmission quality monitoring is the chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a process of describing the second aspect, an example in which the apparatus for determining evaluation time for downlink transmission quality monitoring is a terminal device, and the apparatus includes the processing unit and the transceiver unit is used for description.

The transceiver unit is configured to receive first indication information from a network device, where the first indication information is used to indicate channel occupancy time of the network device; and the processing unit is configured to determine a first quantity based on the first indication information, where the first quantity is a quantity of available reference signals in first evaluation time; and determine the first evaluation time based on the first quantity and a second quantity, where the second quantity is an expected quantity of available reference signals in the first evaluation time, where the available reference signal satisfies at least one of the following:

a moment of receiving the available reference signal is included in the channel occupancy time;

a signal-to-noise ratio of the available reference signal is greater than a signal-to-noise ratio threshold; and a receive power of the available reference signal is greater than a receive power threshold.

It should be understood that the transceiver unit is further configured to perform a sending operation and a receiving operation in any one of the foregoing possible designs, and the processing unit is further configured to perform an operation other than the sending operation and the receiving operation in any one of the foregoing possible designs.

According to a third aspect, an apparatus for determining evaluation time for downlink transmission quality monitoring is provided, where the apparatus for determining evaluation time for downlink transmission quality monitoring includes a processor. Optionally, the apparatus may further include a memory, configured to store computer instructions. The processor and the memory are coupled to each other, and are configured to implement the method in any one of the first aspect or the possible designs. Alternatively, the apparatus for determining evaluation time for downlink transmission quality monitoring may not include the memory, and the memory may be located outside the apparatus for determining evaluation time for downlink transmission quality monitoring. Optionally, the apparatus for determining evaluation time for downlink transmission quality monitoring may further include a communication interface, configured to communicate with another apparatus or device. The processor, the memory, and the communication interface are coupled to each other, to implement the method in any one of the first aspect or the possible designs. For example, when the processor executes the computer instruction stored in the memory, the apparatus for determining evaluation time for downlink transmission quality monitoring is enabled to perform the method in any one of the first aspect or the possible designs. For example, the apparatus for determining evaluation time for downlink transmission quality monitoring is a communication device, or a chip or another component disposed in the communication device. For example, the communication device is a terminal device.

If the apparatus for determining evaluation time for downlink transmission quality monitoring is the communication device, the communication interface is implemented as, for example, a transceiver (or a transmitter and a receiver) in the communication device, and the transceiver is implemented as, for example, an antenna, a feeder, and a codec in the communication device. Alternatively, if the apparatus for determining evaluation time for downlink transmission quality monitoring is the chip disposed in the communication device, the communication interface is, for example, an input/output interface such as an input/output pin in the chip, and the communication interface is connected to a radio frequency transceiver component in the communication device, to implement information receiving and sending by using the radio frequency transceiver component.

According to a fourth aspect, this application provides a computer-readable storage medium. The storage medium stores computer instructions. When the computer instructions are executed, the method in any one of the first aspect or the possible designs of the first aspect may be implemented.

According to a fifth aspect, this application further provides a computer program product, including a computer program or instructions. When the computer program or the instructions is/are executed, the method in any one of the first aspect or the possible designs of the first aspect may be implemented.

According to a sixth aspect, this application further provides a chip. The chip is configured to implement the method in any one of the first aspect or the possible designs of the first aspect.

For technical effects that can be achieved in the second aspect to the sixth aspect, refer to technical effects that can be achieved in the first aspect.

DESCRIPTION OF EMBODIMENTS

Figure 1:
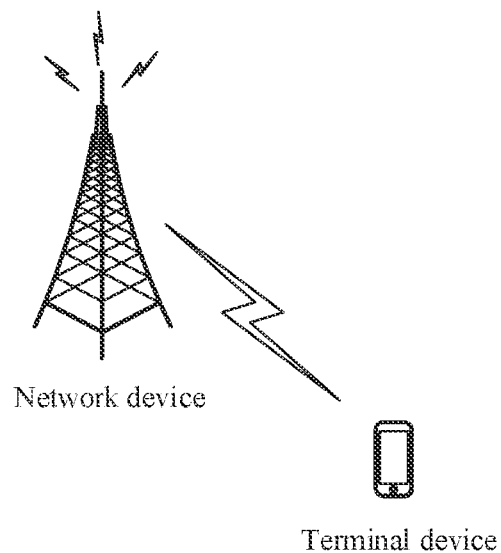
FIG. 1 is a schematic diagram of a communication architecture according to an embodiment of this application.

The technical solutions in embodiments of this application may be applied to various communication systems, for example, may be applied to a 5th generation (5G) communication system, or may be applied to a worldwide interoperability for microwave access (WiMAX) or a future communication system, for example, a future 6th generation (6G) system. 5G may also be referred to as new radio (NR). For example, an architecture of a communication system to which embodiments of this application are applied may be shown in FIG. 1, including a network device and a terminal device. The network device and the terminal device may perform wireless communication. It should be noted that a quantity of terminal devices and a quantity of network devices in the communication system shown in FIG. 1 are not limited in embodiments of this application.

Before embodiments of this application are described, some terms in embodiments of this application are first described, to help a person skilled in the art have a better understanding.

(1) Terminal device: The terminal device includes a device that provides a voice and/or data connectivity for a user. Specifically, the terminal device includes a device that provides a voice for the user, or includes a device that provides data connectivity for the user, or includes a device that provides a voice and data connectivity for the user. For example, the terminal device may include a handheld device having a wireless connection function or a processing device connected to a wireless modem. The terminal device may communicate with a core network through a radio access network (RAN), and exchange a voice or data with the RAN, or exchange a voice and data with the RAN. The terminal device may include user equipment (UE), a wireless terminal device, a mobile terminal device, a device-to-device (D2D) communication terminal device, a vehicle-to-everything (V2X) terminal device, a machine-to-machine/machine type communication (M2M/MTC) terminal device, an Internet of Things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless phone, a session initiation protocol (SIP) phone set, a wireless local loop (WLL) station, or a personal digital assistant (PDA). The terminal device further includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, an intelligent wearable device, or the like, and is a generic term for wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is more than a hardware device. The wearable device implements powerful functions through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

However, if the various terminal devices described above are located in a vehicle (for example, placed in the vehicle or mounted in the vehicle), the terminal devices may be all considered as vehicle-mounted terminal devices. For example, the vehicle-mounted terminal device is also referred to as an on board unit (OBU).

In embodiments of this application, the terminal device may further include a relay. Alternatively, it may be understood that any device that can perform data communication with a base station may be considered as a terminal device.

In embodiments of this application, an apparatus configured to implement a function of a terminal device may be a terminal device, or may be an apparatus, for example, a chip system, that can support the terminal device in implementing the function. The apparatus may be mounted in the terminal device. In this embodiment of this application, the chip system may include a chip, or may include a chip and another discrete component. In the technical solutions provided in embodiments of this application, the technical solutions provided in embodiments of this application are described by using an example in which an apparatus for implementing a function of the terminal is the terminal device.

(2) Network device: The network device includes, for example, an access network (AN) device such as a base station (for example, an access point), and may be a device that communicates with a wireless terminal device through an air interface by using one or more cells in an access network. Alternatively, the network device is, for example, a road side unit (RSU) in a vehicle-to-everything (V2X) technology. The base station may be configured to perform mutual conversion between a received over-the-air frame and an IP packet, to serve as a router between the terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or eNodeB) in a long term evolution (LTE) system or a long term evolution-advanced (LTE-A) system, or may include a next generation NodeB (gNB) in a 5th generation ( ) mobile communication technology new radio (NR) system (also referred to as an NR system for short), or may include a centralized unit (CU) and a distributed unit (DU) in a cloud radio access network (C-RAN) system. This is not limited in embodiments of this application.

The network device may further include a core network device, and the core network device includes, for example, an access and mobility management function (AMF). Embodiments of this application do not relate to a core network. Therefore, unless otherwise specified in the following specification, the network device refers to an access network device.

In embodiments of this application, an apparatus configured to implement a function of a network device may be a network device, or may be an apparatus, for example, a chip system, that can support the network device in implementing the function. The apparatus may be mounted in the network device. The technical solutions provided in embodiments of this application are described by using an example in which an apparatus for implementing a function of the network device is the network device.

(3) RRC connected state (also referred to as a connected state for short, where in this specification, the "connected state" and the "RRC connected state" are a same concept, and the two terms are interchangeable): A terminal device establishes an RRC connection to a network, and may transmit data.

(4) Clear channel assessment (CCA): In a communication system, before sending data on a channel, a device first performs receiving on the channel. If it is discovered that no other device sends data on the channel after given duration, it is determined that clear channel assessment succeeds, and the device may start to send the data or if it is discovered that another device sends data on the channel, the device randomly avoids, for a time period, sending the data, and retries the process. The method can effectively avoid a collision on the channel, and may also be referred to as carrier sense multiple access with collision avoidance (CSMA/CA).

(5) Listen before talk (LBT): Before obtaining access to an unauthorized radio frequency spectrum and communicating on the unauthorized radio frequency spectrum, a device may perform a listen before talk (LBT) process to contend for the access to the unauthorized radio frequency spectrum. The LBT process may include performing clear channel assessment, to determine whether a channel in the unauthorized radio frequency spectrum is available.

(6) First evaluation time: In embodiments of this application, the first evaluation time is a detection sliding window of a reference signal. A terminal device determines transmission quality based on a reference signal received in the detection sliding window. A size of the detection sliding window gradually changes as the terminal device receives the reference signal. In other words, each time the terminal device receives a reference signal, the terminal device correspondingly determines first evaluation time (a detection sliding window), and when receiving each reference signal, evaluates quality of a current channel based on a detection result of the reference signal in the corresponding first evaluation time (the detection sliding window), for example, performs out-of-synchronization evaluation.

Using an example in which the reference signal is a synchronization signal block (SSB), the following Table 1 shows evaluation time of SSB-based radio link monitoring of NR in a licensed spectrum. $T_{Evaluate\_out\_SSB}$ indicates evaluation time of out-of-synchronization evaluation in SSB-based radio link monitoring, and $T_{Evaluate\_in\_SSB}$ indicates evaluation time of synchronization evaluation in SSB-based radio link monitoring.

a precision requirement for quality monitoring such as out-of-synchronization evaluation, and avoid problems such as a delay increase and a performance loss caused because the evaluation time is set to be excessively long.

An example in which downlink transmission quality monitoring is out-of-synchronization evaluation in radio link monitoring or beam failure detection is used below for description. In other words, an example in which the first evaluation time is evaluation time of out-of-synchronization evaluation and the terminal device determines evaluation time (the first evaluation time) of the out-of-synchronization evaluation in the radio link monitoring or the beam failure detection is used for description. When the downlink transmission quality monitoring is the radio link monitoring, the evaluation time, determined by the terminal device, of the out-of-synchronization evaluation in the radio link monitoring is evaluation time determined for a downlink of a network device. The terminal device may filter detection results (for example, signal-to-noise ratios) of all reference signals in the determined evaluation time, and may compare an average value of the filtered detection results of the reference signals with an out-of-synchronization threshold, to determine whether the downlink is out-of-synchronization. When the downlink transmission quality monitoring is the beam failure detection, the evaluation time, determined by the terminal device, of the out-of-synchronization evaluation in the beam failure detection is evaluation time determined for a downlink beam of a network device. The terminal device may filter detection results (for example, signal-to-noise ratios) of all reference signals in the determined evaluation time, and may compare an average value of the filtered detection results of the reference signals with an out-of-synchronization threshold, to determine whether the downlink beam is out-of-synchronization.

The following describes in detail embodiments of this application with reference to the accompanying drawings. In addition, it should be understood that, in embodiments of this application, "at least one" may also be described as "one or more", and "a plurality of" may be "two, three, four, or more". This is not limited in this application.

In embodiments of this application, "/" may represent an "or" relationship between associated objects, for example, A/B may represent A or B; "and/or" may be used to describe three relationships between associated objects, for example, A and/or B may represent the following three cases: only A

TABLE 1

| Configuration | $T_{Evaluate\_out\_SSB}$ (ms) | $T_{Evaluate\_in\_SSB}$ (ms) |
|---|---|---|
| no DRX | Max(200, Ceil (10*P)*$T_{SSB}$) | Max (100, Ceil (5*P)*$T_{SSB}$) |
| DRX cycle ≤ 320 | Max (200, Ceil (15*P)*Max(TDRX, $T_{SSB}$)) | Max (100, Ceil (7.5*P)*Max($T_{DRX}$, $T_{SSB}$)) |
| DRX cycle > 320 | Ceil(10*P)*$T_{DRX}$ | Ceil(5*P)*$T_{DRX}$ |

NOTE:
$T_{SSB}$ is the periodicity of the SSB configured for RLM $T_{DRX}$ is the DRX cycle length.

In embodiments of this application, evaluation time for downlink/beam quality monitoring in an unlicensed spectrum is different from fixed evaluation time for downlink/beam quality monitoring in a licensed spectrum (for example, the fixed evaluation time for out-of-synchronization evaluation shown in Table 1). During downlink/beam quality monitoring, whether a received reference signal is available is determined, and evaluation time is dynamically determined based on a quantity of available reference signals in the evaluation time and an expected quantity of available reference signals in the evaluation time, to satisfy exists, both A and B exist, and only B exists. A and B may be singular or plural. For ease of describing the technical solutions in embodiments of this application, in embodiments of this application, terms such as "first" and "second" may be used to distinguish technical features having same or similar functions. Terms such as "first" and "second" do not limit a quantity and an execution sequence, and the terms such as "first" and "second" do not indicate a definite difference. In embodiments of this application, a word such as "example" or "for example" is used to represent giving an example, an illustration, or a description. An embodiment or design described as "example" or "for example" should not be explained as being more preferred or advantageous over other embodiments or designs. Use of the word such as "example" or "for example" is intended to present a relative concept in a specific manner for ease of understanding.

Embodiment 1

Figure 2:
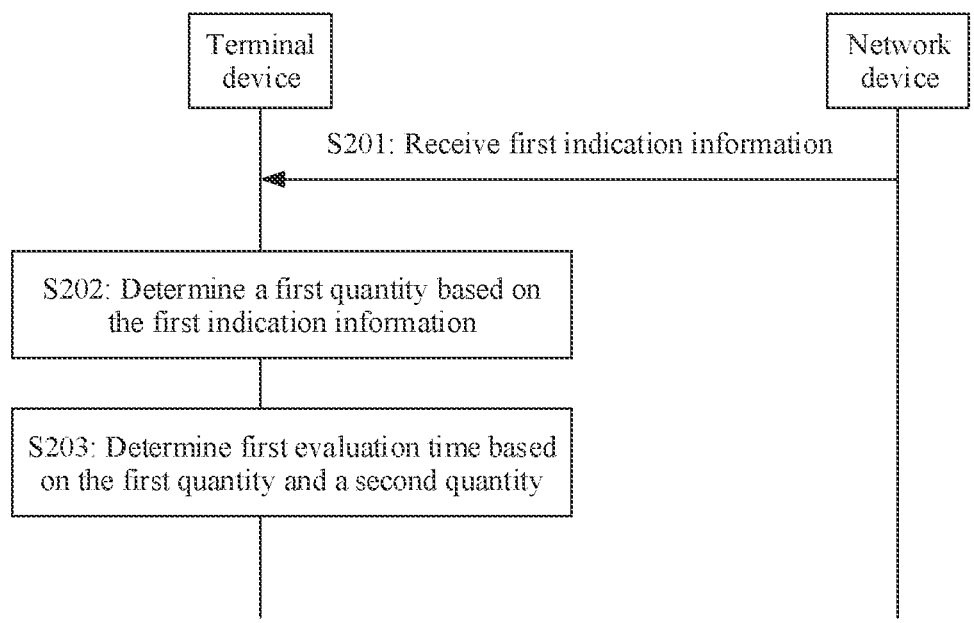
FIG. 2 is a schematic diagram of a process of determining evaluation time for downlink transmission quality monitoring according to an embodiment of this application.

FIG. 2 is a schematic diagram of a process of determining evaluation time for downlink transmission quality monitoring according to an embodiment of this application. The process includes the following steps.

S201: A terminal device receives first indication information from a network device, where the first indication information is used to indicate channel occupancy time of the network device.

Before sending data on a channel in an unlicensed spectrum (frequency band), to avoid a conflict on the channel, a device first needs to perform clear channel assessment or listen before talk on the channel. After successfully performing clear channel assessment or listen before talk on the channel, the device can send the data in specified channel occupancy time.

In this embodiment of this application, to avoid a conflict on a channel in an unlicensed spectrum, before sending a reference signal on the channel in the unlicensed spectrum, the network device may first perform clear channel assessment or listen before talk on the channel in the unlicensed spectrum. After successfully performing clear channel assessment or listen before talk, the network device indicates, to the terminal device by using the first indication information, channel occupancy time of the network device on the channel in the unlicensed spectrum, and sends the reference signal on the channel in the unlicensed spectrum.

For example, the network device performs clear channel assessment before sending the reference signal on the channel in the unlicensed spectrum. Before sending the reference signal on the channel in the unlicensed spectrum, the network device first performs receiving on the channel in the unlicensed spectrum. If the network device does not receive, on the channel in the unlicensed spectrum after given duration (such as 3 s or 5 s), data sent by another device, clear channel assessment is successfully performed on the channel in the unlicensed spectrum, and the network device may send the reference signal on the channel in the unlicensed spectrum in the specified channel occupancy time. If the network device receives, on the channel in the unlicensed spectrum after given duration, data sent by another device, the network device determines that clear channel assessment fails to be performed on the channel in the unlicensed spectrum, and the network device may perform clear channel assessment on the channel in the unlicensed spectrum again.

After the network device successfully performs clear channel assessment on the channel in the unlicensed spectrum, the network device sends the first indication to the terminal device, to indicate the channel occupancy time of the network device on the channel in the unlicensed spectrum, and sends the reference signal on the channel in the unlicensed spectrum.

Optionally, the first indication information may indicate the channel occupancy time of the network device by directly indicating the channel occupancy time of the network device. For example, after performing clear channel assessment on the channel in the unlicensed spectrum, the network device may occupy the channel in the unlicensed spectrum from 10:10:10 to 10:10:20 to send the reference signal. The first indication information may directly indicate the channel occupancy time "10:10:10 to 10:10:20" of the network device on the channel in the unlicensed spectrum. Certainly, the first indication information may alternatively indicate the channel occupancy time of the network device by indirectly indicating the channel occupancy time of the network device. For example, after performing clear channel assessment on the channel in the unlicensed spectrum, the network device may occupy the channel in the unlicensed spectrum from 10:10:10 to 10:10:20 to send the reference signal. The first indication information may indicate a channel occupancy end moment "10:10:20" of the network device on the channel in the unlicensed spectrum, to indicate that the network device may occupy the channel in the unlicensed spectrum before 10:10:20 to send the reference signal. After receiving the first indication information sent by the network device, the terminal device determines, based on a current moment "10:10:10" of the terminal device and the channel occupancy end moment "10:10:20" of the network device, the channel occupancy time "10:10:10 to 10:10:20" of the network device on the channel in the unlicensed spectrum. The first indication information may alternatively indicate remaining channel occupancy time, for example, "10 s", of the network device on the channel in the unlicensed spectrum. After receiving the first indication information sent by the network device, the terminal device determines, based on a current moment "10:10:10" of the terminal device and the remaining channel occupancy time "10 s" of the network device, that the channel occupancy time of the network device on the channel in the unlicensed spectrum is "10:10:10 to 10:10:20".

In addition, it should be understood that the first indication information may also be referred to as auxiliary information or the like. This is not limited in this embodiment of this application. In an example, the network device may send the first indication information to the terminal device by using a broadcast message, a multicast message, an RRC message, a downlink control information (DCI) message, or the like.

In a possible implementation, the network device further sends configuration information to the terminal device. The configuration information includes type information (for example, a synchronization signal block (SSB) or a channel state information reference signal (CSI-RS)), time domain position information (for example, a sending periodicity), and the like of the reference signal. For example, the configuration information includes information that the reference signal is an SSB and a sending periodicity is 20 ms. The configuration information may be sent before the first indication information, may be sent after the first indication information, or may be simultaneously sent with the first indication information. This is not limited in this embodiment of this application.

S202: The terminal device determines a first quantity based on the first indication information, where the first quantity is a quantity of available reference signals in first evaluation time.

The available reference signal satisfies at least one of the following:
 a moment of receiving the available reference signal is included in the channel occupancy time;
 a signal-to-noise ratio of the available reference signal is greater than a signal-to-noise ratio threshold; and
 a receive power of the available reference signal is greater than a receive power threshold.

The terminal device detects the reference signal at each receiving position (for example, a time domain position) of the reference signal on the channel in the unlicensed spectrum. The terminal device may receive the reference signal at each receiving position of the reference signal on the channel in the unlicensed spectrum by default.

When a reference signal detected by the terminal device satisfies that a moment of receiving the reference signal (namely, a time domain position at which the reference signal is received) is included in the channel occupancy time indicated by the first indication information, it indicates that the network device can send the reference signal. In other words, a case in which the network device does not send the reference signal because clear channel assessment or listen before talk fails does not exist. When receiving the reference signal at the receiving position of the reference signal, the terminal device may determine the reference signal as the available reference signal.

When there is no reference signal on the channel, usually only noise exists on the channel, and a signal-to-noise ratio is low. When a signal-to-noise ratio of a reference signal detected by the terminal device is greater than the signal-to-noise ratio threshold, it indicates that the terminal device receives the reference signal at a receiving position of the reference signal, and the terminal device may determine the reference signal as the available reference signal.

When there is no reference signal on the channel, usually only noise exists on the channel, and a receive power of the terminal device is usually low when there is only a noise signal. When a receive power of a reference signal detected by the terminal device is greater than the receive power threshold, it indicates that the terminal device receives the reference signal at a receiving position of the reference signal, and the terminal device may determine the reference signal as the available reference signal.

Therefore, in this embodiment of this application, when a detected reference signal satisfies one or more of the following: a moment of receiving the reference signal is included in the channel occupancy time indicated by the first indication information; a signal-to-noise ratio of the reference signal is greater than the signal-to-noise ratio threshold; and a receive power of the reference signal is greater than the receive power threshold, the terminal device may determine that the available reference signal is detected at a receiving position of the reference signal on the channel in the unlicensed spectrum.

It should be understood that, in this embodiment of this application, a condition for determining the available reference signal may be set based on a communication requirement. For example, it is set in such a manner that when only at least one of the following is satisfied: a moment of receiving a reference signal is included in the channel occupancy time indicated by the first indication information and a signal-to-noise ratio of the reference signal is greater than the signal-to-noise ratio threshold, the detected reference signal is determined as the available reference signal.

S203: The terminal device determines the first evaluation time based on the first quantity and a second quantity, where the second quantity is an expected quantity of available reference signals in the first evaluation time.

In this embodiment of this application, each time the terminal device detects the reference signal at a receiving position of the reference signal on the channel in the unlicensed spectrum, the first evaluation time is determined once. In other words, each time the terminal device detects the reference signal, a detection sliding window for out-of-synchronization evaluation is determined.

Specifically, the terminal device may determine the first evaluation time based on the expected quantity (the second quantity) of available reference signals in the first evaluation time and the quantity (the first quantity) of available reference signals in the first evaluation time. For example, the terminal device may continuously extend the first evaluation time based on initial first evaluation time until the first quantity reaches the second quantity in the first evaluation time, to obtain final first evaluation time. An initial value of the first evaluation time is the initial first evaluation time, and the initial first evaluation time is predefined or preconfigured. For example, the initial first evaluation time is three reference signal sending periodicities or four reference signal sending periodicities. In other words, when the first evaluation time is adjusted for the first time, the first evaluation time is the initial value, namely, the initial first evaluation time. The terminal device determines the first evaluation time based on the expected quantity (the second quantity) of available reference signals in the first evaluation time and the quantity (the first quantity) of available reference signals in the initial first evaluation time.

Optionally, to quickly determine the first evaluation time, the initial first evaluation time may be the same as time for receiving the second quantity of reference signals. The second quantity may be predefined or preconfigured based on a communication requirement, for example, may be determined based on a quantity of reference signals that corresponds to evaluation time (second evaluation time) of out-of-synchronization evaluation in a licensed spectrum. For example, if the quantity of reference signals that corresponds to the evaluation time of the out-of-synchronization evaluation in the licensed spectrum is 4, in this embodiment of this application, the second quantity may be determined as 4, and the initial first evaluation time is four reference signal sending periodicities.

In addition, to avoid an unnecessary performance loss caused to the terminal device by excessively extended the first evaluation time, the terminal device may determine the first evaluation time based on a difference between the second quantity (the expected quantity of available reference signals in the first evaluation time) and the first quantity (the quantity of available reference signals in the first evaluation time) and an expansion factor. The terminal device may further limit the first evaluation time based on an evaluation time threshold, an extended time threshold, and the like. The following provides descriptions with reference to specific implementations.

Manner 1: The first evaluation time is determined based on the difference between the second quantity and the first quantity and the expansion factor.

In a possible implementation, when the first evaluation time is less than a first time value, the terminal device extends the first evaluation time until the first evaluation time is greater than or equal to the first time value. The first time value is determined based on the difference between the second quantity and the first quantity and the expansion factor. For example, the first time value is $T_1$ reference signal sending periodicities, where $T_1=(N-n)*a+n$, N is the second quantity, n is the first quantity, and a is the expansion factor. The expansion factor "a" is a preconfigured or predefined constant, and is usually a positive integer such as 2 or 3.

Figure 3:
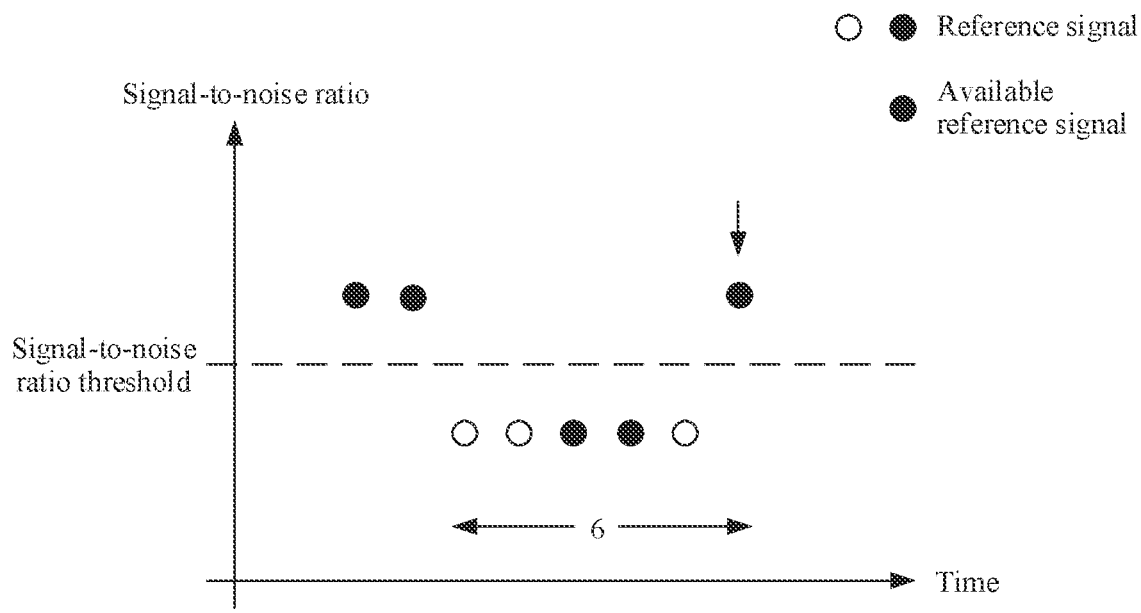
FIG. 3 is a schematic diagram 1 of determining first evaluation time according to an embodiment of this application.

Using an example in which the second quantity is 4, the initial first evaluation time is four reference signal sending periodicities, and "a" is 3, $T_1=(4-n)*3+n$. Refer to FIG. 3. Assuming that the quantity of available reference signals in the initial first evaluation time is 3, $T_1$ is 6. The first time value is six reference signal sending periodicities, the first quantity "3" is less than the second quantity "4", and the first evaluation time is less than the first time value. The terminal device extends the first evaluation time to five reference signal sending periodicities. In this case, the first quantity is still less than the second quantity, and the first evaluation time is still less than the first time value. The terminal device extends the first time to six reference signal sending periodicities. In this case, the first quantity is still less than the second quantity, but the first evaluation time is equal to the first time value. The terminal device no longer extends the first evaluation time, and determines that the first evaluation time is six reference signal sending periodicities.

In another possible implementation, the terminal device may alternatively determine the first quantity based on the quantity of available reference signals in the initial first evaluation time, and directly determine the first evaluation time based on a first time value determined based on the difference between the second quantity and the first quantity and the expansion factor. For example, the first time value is $T_1$ reference signal sending periodicities, where $T_1=(N-n)*a+n$. Because the first quantity is determined based on the quantity of available reference signals in the initial first evaluation time, the first quantity does not change with a change of the first evaluation time, and a value of $T_1$ does not change with the change of the first evaluation time. The terminal device may directly determine the first time value as the first evaluation time. Still using an example in which the second quantity is 4, the initial first evaluation time is four reference signal sending periodicities, and "a" is 3, $T_1=(4-n)*3+n$. Assuming that the quantity of available reference signals in the initial first evaluation time is 3. $T_1$ is 6. The first time value is six reference signal sending periodicities, and the terminal device determines that the first evaluation time is six reference signal sending periodicities.

To further avoid an excessively large first time value that causes excessively long first evaluation time and a performance loss, in a possible implementation, the evaluation time threshold may be set to limit the first evaluation time, that is, the first evaluation time is less than or equal to the evaluation time threshold. The evaluation time threshold may be predefined or preconfigured.

Figure 4:
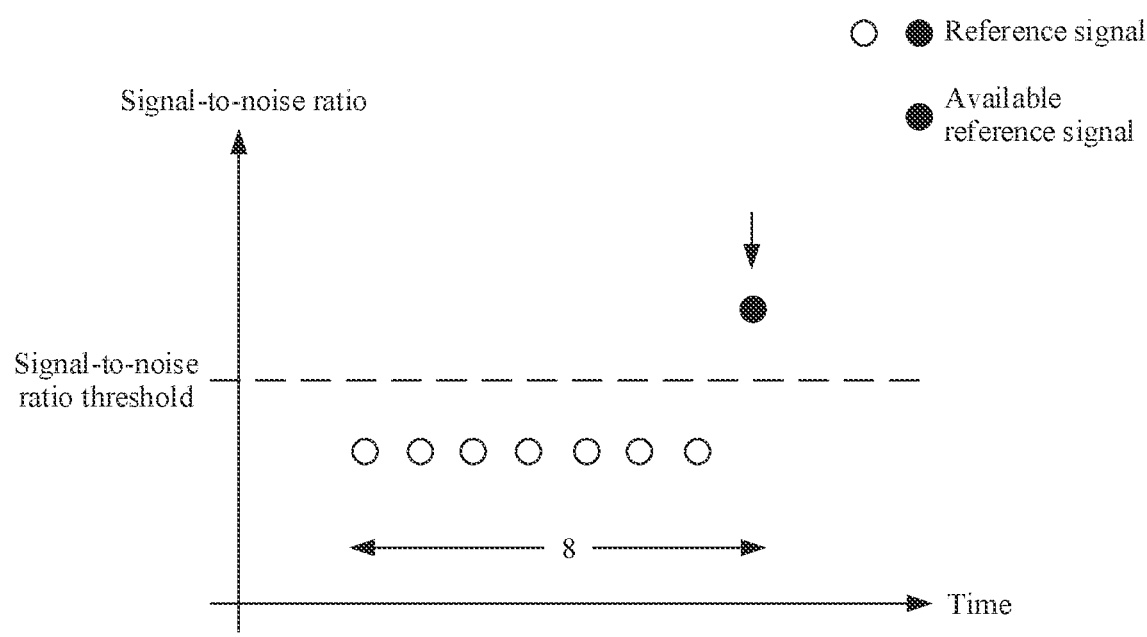
FIG. 4 is a schematic diagram 2 of determining first evaluation time according to an embodiment of this application.

Using an example in which the second quantity is 4, the initial first evaluation time is four reference signal sending periodicities, "a" is 3, the evaluation time threshold is eight reference signal sending periodicities, and the first quantity is the quantity of available reference signals in the first evaluation time, $T_1=(4-n)*3+n$. Refer to FIG. 4. Assuming that the quantity of available reference signals in the initial first evaluation time is 1. $T_1$ is 10. The terminal device continuously extends the first evaluation time, and the quantity of available reference signals in the first evaluation time is still 1. The first evaluation time is limited to eight reference signal sending periodicities instead of 10 reference signal sending periodicities by using the evaluation time threshold, so that a problem that the first evaluation time is excessively long is avoided.

In a possible implementation, a first threshold may further be set to limit the difference between the second quantity and the first quantity, or a first threshold is set to limit a product of the difference between the second quantity and the first quantity and the expansion factor. To be specific, the difference between the second quantity and the first quantity is less than or equal to the first threshold, or the product of the difference between the second quantity and the first quantity and the expansion factor is less than or equal to the first threshold. The first threshold may be predefined or preconfigured.

For example, the second quantity is 4, the initial first evaluation time is four reference signal sending periodicities, "a" is 3, the first threshold is 8, the first quantity is the quantity of available reference signals in the initial first evaluation time, and the first threshold is used to limit the product of the difference between the second quantity and the first quantity and the expansion factor, that is, limit $(4-n)*3$ in $T_1=(4-n)*3+n$. Assuming that the quantity of available reference signals in the initial first evaluation time is 0, $T_1=(4-0)*3+0$. $T_1$ is limited to being less than or equal to 8+n by using the first threshold. In this way, the terminal device determines that the first evaluation time is eight reference signal sending periodicities instead of 12 reference signal sending periodicities, so that a problem that the first evaluation time is excessively long is avoided.

Manner 2: The first evaluation time is extended until the first quantity reaches the second quantity or the first evaluation time reaches the evaluation time threshold.

Figure 5:
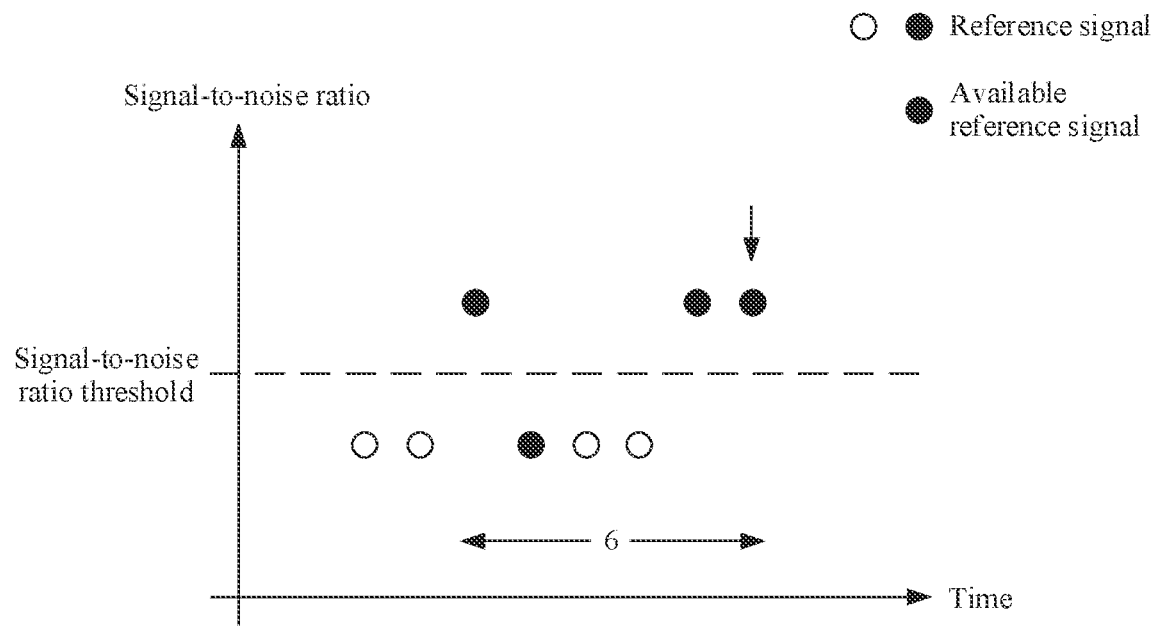
FIG. 5 is a schematic diagram 3 of determining first evaluation time according to an embodiment of this application.

The evaluation time threshold may be predefined or preconfigured. For example, the second quantity is 4, the initial first evaluation time is four reference signal sending periodicities, and the evaluation time threshold is eight reference signal sending periodicities. Refer to FIG. 5. The terminal device receives four reference signals in the initial first evaluation time, where two of the reference signals are available reference signals (the first quantity). The first quantity is less than the second quantity, and the first evaluation time is less than the evaluation time threshold. The terminal device extends the first evaluation time to five reference signal sending periodicities. After the first evaluation time is extended, the first quantity is 3, and is still less than the second quantity, and the first evaluation time is less than the evaluation time threshold. The terminal device continues to extend the first evaluation time to six reference signal sending periodicities. After the first evaluation time is extended, the first quantity is 4, and is equal to the second quantity. The terminal device determines that the first evaluation time is six reference signal sending periodicities.

Manner 3: The first evaluation time is extended until the first quantity reaches the second quantity or time by which the first evaluation time is extended reaches the extended time threshold.

Figure 6:
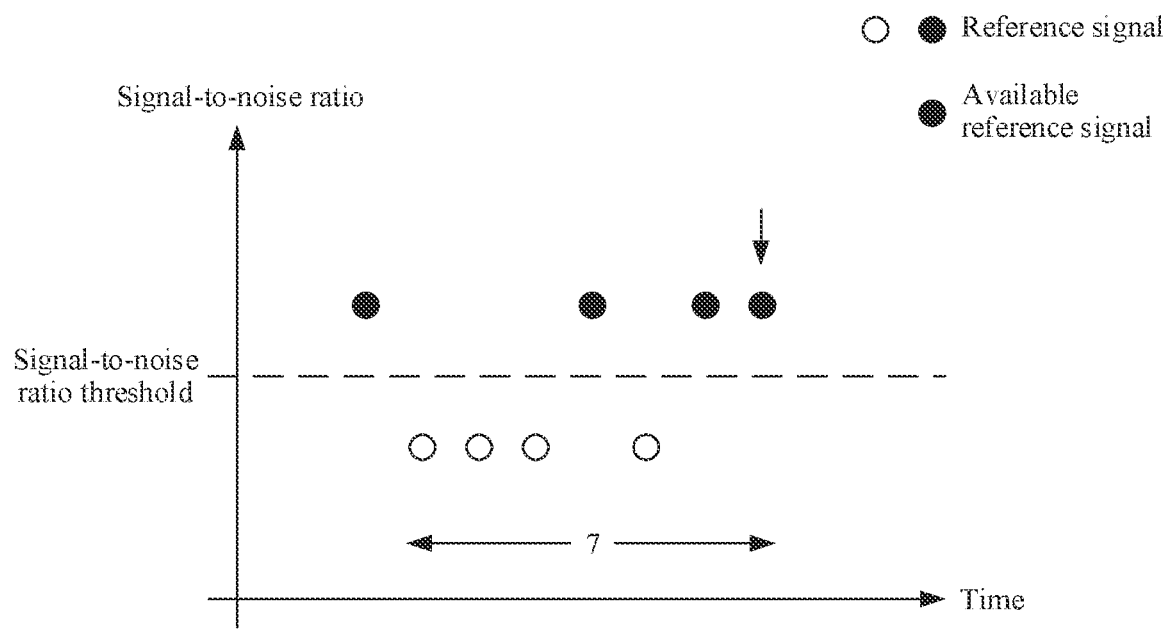
FIG. 6 is a schematic diagram 4 of determining first evaluation time according to an embodiment of this application.

The extended time threshold may be predefined or preconfigured. For example, the second quantity is 4, the initial first evaluation time is four reference signal sending periodicities, and the extended time threshold is three reference signal sending periodicities. Refer to FIG. 6. The terminal device receives four reference signals in the initial first evaluation time, where three of the reference signals are available reference signals (the first quantity). The first quantity is less than the second quantity. After the terminal device extends the first evaluation time to five reference signal sending periodicities, the first quantity is still less than the second quantity, and extended time (one reference signal sending periodicity) is still less than the extended time threshold. The terminal device continues to extend the first evaluation time until the terminal device extends the first evaluation time to seven reference signal sending periodicities. In this case, the first quantity is still less than the second quantity, but extended time (three reference signal sending periodicities) reaches the extended time threshold. The terminal device determines that the first evaluation time is seven reference signal sending periodicities.

In addition, the evaluation time in this embodiment of this application may also be referred to as evaluation duration, a sliding window size, an evaluation window size, or the like.

In another possible implementation, the first evaluation time may alternatively be determined based on a quantity of available discontinuous reception (DRX) periodicities, and all reference signals in the available discontinuous reception periodicity are available reference signals. For example, when the first evaluation time is determined based on the quantity of available discontinuous reception periodicities, the first quantity is a quantity of available discontinuous reception periodicities in the first evaluation time, and the second quantity is an expected quantity of available discontinuous reception periodicities in the first evaluation time. For specific details of determining the first evaluation time based on the quantity of available discontinuous reception periodicities (the first quantity and the second quantity), refer to the related descriptions of determining the first evaluation time based on the quantity of available reference signals (the first quantity and the second quantity). Details are not described herein again.

The terminal device detects the reference signal at each receiving position of the reference signal on the channel in the unlicensed spectrum. After determining the first evaluation time, the terminal device may filter detection results (for example, signal-to-noise ratios) of all reference signals in the determined first evaluation time, and may compare an average value of the filtered detection results of the reference signals with an out-of-synchronization threshold, to determine whether a radio link is out-of-synchronization.

In addition, it should be understood that an example of determining evaluation time (the first evaluation time) of out-of-synchronization evaluation in radio link monitoring or beam failure detection in downlink transmission quality monitoring is used above. It may be understood that the downlink transmission quality monitoring method provided in this embodiment of this application is also applicable to determining other evaluation time, for example, determining evaluation time of synchronization evaluation in the radio link monitoring or the beam failure detection in the downlink transmission quality monitoring. In other words, the first evaluation time is the evaluation time of the synchronization evaluation.

For example, the evaluation time (the first evaluation time) of the synchronization evaluation in the radio link monitoring is determined, and the first evaluation time is determined based on the quantity of available reference signals. It is assumed that the expected quantity of available reference signals in the first evaluation time is five reference signals, and the initial first evaluation time is four reference signal periodicities. In this case, the terminal device may continuously extend the first evaluation time based on the initial first evaluation time, and stops extending the first evaluation time when the quantity (the first quantity) of available reference signals in the first evaluation time is 5 (the second quantity), to obtain final first evaluation time (the evaluation time of the synchronization evaluation).

Embodiment 2

In embodiments provided in this application, the method provided in embodiments of this application is described from perspectives of the terminal device and interaction between the network device and the terminal device. To implement the functions in the method provided in embodiments of this application, the network device and the terminal device may each include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 7:
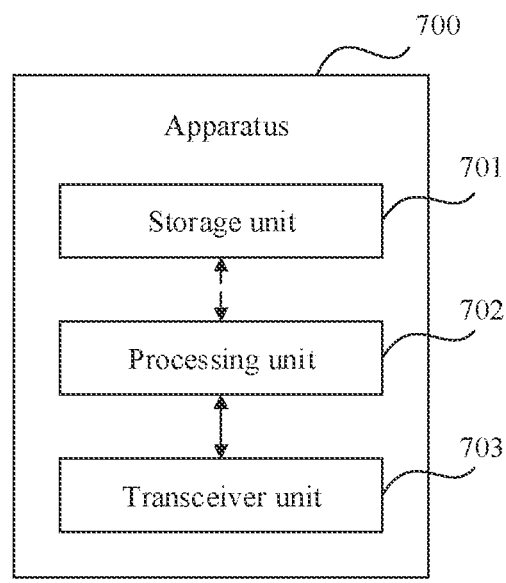
FIG. 7 is a schematic block diagram 1 of an apparatus for determining evaluation time for downlink transmission quality monitoring according to an embodiment of this application.

When an integrated unit (module) is used, FIG. 7 is a possible schematic block diagram of an apparatus for determining evaluation time for downlink transmission quality monitoring according to an embodiment of this application. The apparatus 700 may exist in a form of software, hardware, or a combination of software and hardware. This is not limited in this embodiment of this application. The apparatus 700 may include a processing unit 702 and a transceiver unit 703.

In a possible design, the processing unit 702 is configured to implement a corresponding processing function. The transceiver unit 703 is configured to support the apparatus 700 in communicating with another network entity. Optionally, the transceiver unit 703 may include a receiving unit and/or a sending unit, which are respectively configured to perform a receiving operation and a sending operation. Optionally, the apparatus 700 may further include a storage unit 701, configured to store program code and/or data of the apparatus 700.

The apparatus 700 may be configured to implement the function of the terminal device in any one of the foregoing embodiments. The processing unit 702 may support the apparatus 700 in performing actions of the terminal device in the foregoing method examples. Alternatively, the processing unit 702 mainly performs internal actions of the terminal device in the method examples, and the transceiver unit 703 may support communication between the apparatus 700 and a network device.

In a possible embodiment, the transceiver unit 703 is configured to receive first indication information from a network device, where the first indication information is used to indicate channel occupancy time of the network device; and the processing unit 702 is configured to determine a first quantity based on the first indication information, where the first quantity is a quantity of available reference signals in first evaluation time; and determine the first evaluation time based on the first quantity and a second quantity, where the second quantity is an expected quantity of available reference signals in the first evaluation time, where the available reference signal satisfies at least one of the following:

a moment of receiving the available reference signal is included in the channel occupancy time;

a signal-to-noise ratio of the available reference signal is greater than a signal-to-noise ratio threshold; and a receive power of the available reference signal is greater than a receive power threshold.

In a possible design, the first evaluation time is determined based on a difference between the second quantity and the first quantity and an expansion factor, and the expansion factor is predefined or preconfigured.

In a possible design, an initial value of the first evaluation time is initial first evaluation time, and the initial first evaluation time is predefined or preconfigured.

In a possible design, the first evaluation time is less than or equal to an evaluation time threshold, and the evaluation time threshold is predefined or preconfigured.

In a possible design, the difference between the second quantity and the first quantity is less than or equal to a first threshold, and the first threshold is predefined or preconfigured.

In a possible design, when determining the first evaluation time based on the first quantity and a second quantity, the processing unit 702 is specifically configured to extend the first evaluation time until the first quantity reaches the second quantity or the first evaluation time reaches an evaluation time threshold.

In a possible design, when determining the first evaluation time based on the first quantity and a second quantity, the processing unit 702 is specifically configured to extend the first evaluation time until the first quantity reaches the second quantity or time by which the first evaluation time is extended reaches an extended time threshold.

In a possible design, the second quantity is a quantity of reference signals that corresponds to second evaluation time, and the second evaluation time is evaluation time for downlink transmission quality monitoring in a licensed spectrum.

In a possible design, the processing unit 702 is further configured to determine the first evaluation time based on a quantity of available discontinuous reception periodicities, where all reference signals in the available discontinuous reception periodicity are available reference signals.

In embodiments of this application, division into the units (modules) is an example, is merely logical function division, and may be other division during actual implementation. In addition, function units in embodiments of this application may be integrated into one unit or one processor, or may exist alone physically, or two or more units may be integrated into one unit. The integrated unit may be implemented in a form of hardware, may be implemented in a form of a software functional unit, or may be implemented in a form of hardware and software. This is not limited in this embodiment of this application. For example, the foregoing processing unit 702 may be implemented as a processor, the foregoing transceiver unit 703 may be implemented as a transceiver, a communication interface, or the like, and the storage unit 701 may be implemented as a memory.

Figure 8:
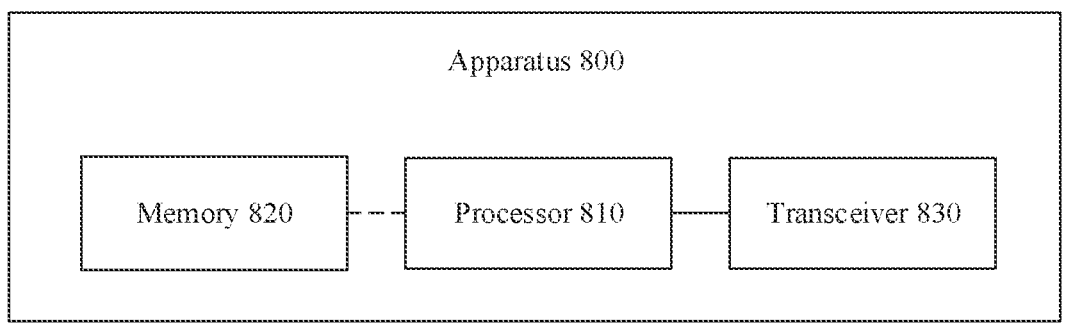
FIG. 8 is a schematic block diagram 2 of an apparatus for determining evaluation time for downlink transmission quality monitoring according to an embodiment of this application.

As shown in FIG. 8, an embodiment of this application further provides an apparatus 800 for determining evaluation time for downlink transmission quality monitoring, configured to implement the function of the terminal device in the foregoing embodiments. The apparatus 800 includes a processor 810 and a transceiver 830. The apparatus 800 may further include a memory 820. In this embodiment of this application, the transceiver may be a transceiver, a bus, a bus interface, a pin, or another apparatus, circuit, or component that can implement a communication function. This is not limited in this embodiment of this application.

In a possible design, the processor 810 may implement the function of the processing unit 702 in the foregoing embodiment, and the transceiver 830 may implement the function of the transceiver unit 703 in the foregoing embodiment.

In a possible design, the memory 820 stores instructions, a program, or data, and the memory 820 may be configured to implement the function of the storage unit 701 in the foregoing embodiment. The processor 810 is configured to read the instructions, the program, or the data stored in the memory 820. When the instructions or the program stored in the memory 820 are/is executed, the processor 810 is configured to perform the operation performed by the processing unit 702 in the foregoing embodiment, and the transceiver 830 is configured to perform the operation performed by the transceiver unit 703 in the foregoing embodiment.

It should be understood that the apparatus 700 or 800 in embodiments of this application may correspond to the terminal device in the method for determining evaluation time for downlink transmission quality monitoring (FIG. 2) in embodiments of this application, and operations and/or functions of the modules in the apparatus 700 or 800 are respectively intended to implement corresponding procedures in the method in FIG. 2. For brevity, details are not described herein again. The apparatus 700 or 800 may be the terminal device, or may be another apparatus that can implement a function of the terminal device, for example, a chip system. The another apparatus may be mounted in the terminal device or used in a matching manner with the terminal device.

An embodiment of this application further provides an apparatus for determining evaluation time for downlink transmission quality monitoring, where the apparatus for determining evaluation time for downlink transmission quality monitoring may be a terminal device or a circuit. The apparatus for determining evaluation time for downlink transmission quality monitoring may be configured to perform the actions performed by the terminal device in the foregoing method embodiments.

Figure 9:
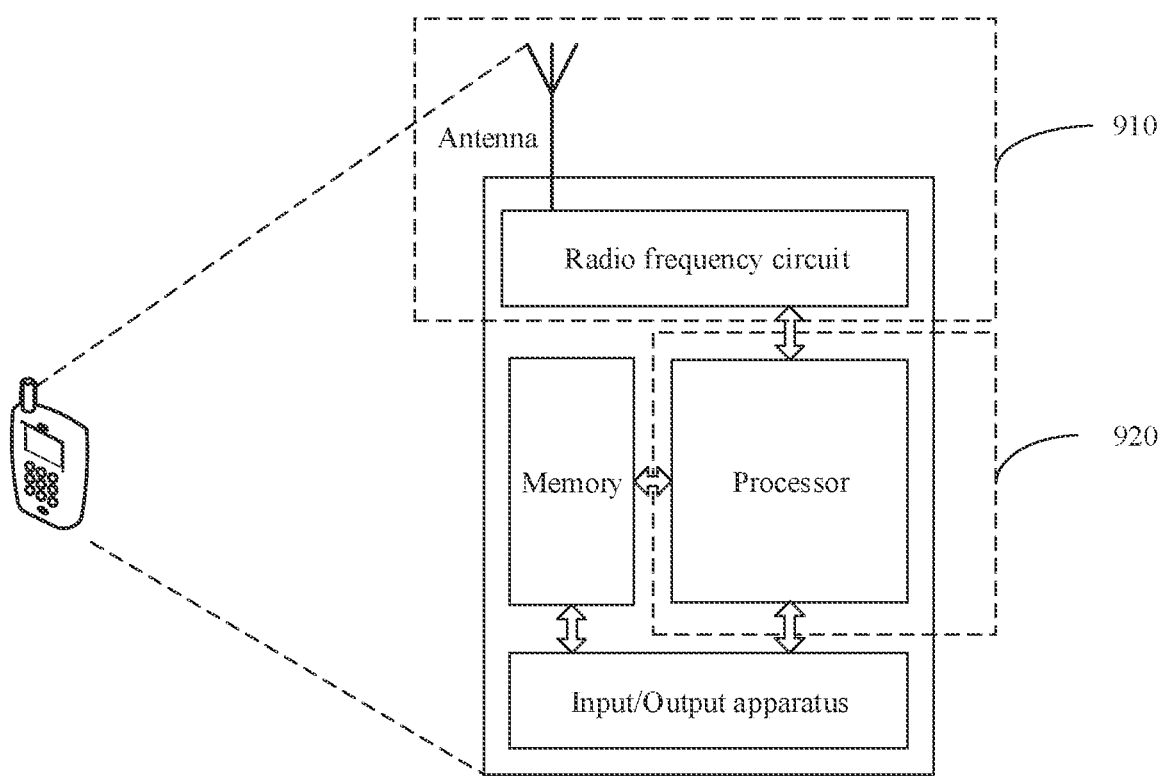
FIG. 9 is a schematic diagram of a structure of a terminal device according to an embodiment of this application.

When the apparatus for determining evaluation time for downlink transmission quality monitoring is the terminal device, FIG. 9 is a simplified schematic diagram of a structure of the terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, a keyboard, is mainly configured to: receive data by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 9 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 9, the terminal device includes a transceiver unit 910 and a processing unit 920. The transceiver unit may also be referred to as a transceiver, a transceiver machine, a transceiver apparatus, a transceiver circuit, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The receiving unit sometimes may also be referred to as a receiver machine, a receiver, a receiver circuit, or the like. The sending unit may also be sometimes referred to as a transmitting machine, a transmitter, a transmit circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation on the terminal device in the foregoing method embodiments.

For example, in an implementation, the transceiver unit 910 is configured to perform the receiving operation on the terminal device side in S201 in FIG. 2. The processing unit 920 is configured to perform the processing operation on the terminal device side in S202 and S203 in FIG. 2; and/or the processing unit 920 is further configured to perform other processing operations on the terminal device side in embodiments of this application.

When the apparatus for determining evaluation time for downlink transmission quality monitoring is a chip-type apparatus or a circuit, the apparatus may include a transceiver unit and a processing unit. The transceiver unit may be an input/output circuit and/or a communication interface. The processing unit is an integrated processor, a microprocessor, or an integrated circuit.

In another form of this embodiment, a computer-readable storage medium is provided. The computer-readable storage medium stores instructions. When the instructions are executed, the method for determining evaluation time for downlink transmission quality monitoring in the foregoing method embodiments may be performed.

In another form of this embodiment, a computer program product including instructions is provided. When the instructions are executed, the method for determining evaluation time for downlink transmission quality monitoring in the foregoing method embodiments may be performed.

In another form of this embodiment, a chip is provided. When the chip runs, the method for determining evaluation time for downlink transmission quality monitoring in the foregoing method embodiments may be performed.

It should be noted that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor, or the like.

It may be understood that the memory or storage unit in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. For example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the method described in this specification is intended to include, but not limited to, these memories and any memory of another proper type.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may be integrated into a processor. The processor and the storage medium may be disposed in the ASIC, and the ASIC may be disposed in a terminal device. Optionally, the processor and the storage medium may alternatively be arranged in different components of the terminal device.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although embodiments of this application are described with reference to specific features, it is clearly that various modifications and combinations may be made to embodiments of this application without departing from the spirit and scope of embodiments of this application. Correspondingly, the specification and accompanying drawings are merely example descriptions of embodiments of this application that are defined by the appended claims, and are considered to cover any or all of modifications, variations, combinations, or equivalents in the scope of embodiments of this application.

What is claimed is:

1. A method for determining evaluation time for downlink transmission quality monitoring, comprising:
   receiving first indication information from a network device, wherein the first indication information indicates channel occupancy time of the network device on a channel in an unlicensed spectrum;
   determining a first quantity based on the first indication information, wherein the first quantity is a quantity of available reference signals in first evaluation time; and
   determining the first evaluation time based on the first quantity and a second quantity, wherein the second quantity is an expected quantity of available reference signals in the first evaluation time, wherein each of the available reference signals satisfies at least one of the following:
      a moment of receiving the available reference signal is comprised in the channel occupancy time;
      a signal-to-noise ratio of the available reference signal is greater than a signal-to-noise ratio threshold; or
      a receive power of the available reference signal is greater than a receive power threshold; and
   wherein determining the first evaluation time based on the first quantity and the second quantity comprises:
      extending the first evaluation time until the first quantity reaches the second quantity or the first evaluation time reaches an evaluation time threshold; or
      extending the first evaluation time until the first quantity reaches the second quantity or time by which the first evaluation time is extended reaches an extended time threshold.

2. The method according to claim 1, wherein the first evaluation time is determined based on a difference between the second quantity and the first quantity and an expansion factor, and the expansion factor is predefined or preconfigured.

3. The method according to claim 2, wherein an initial value of the first evaluation time is initial first evaluation time, and the initial first evaluation time is predefined or preconfigured.

4. The method according to claim 2, wherein the first evaluation time is less than or equal to the evaluation time threshold, and the evaluation time threshold is predefined or preconfigured.

5. The method according to claim 2, wherein the difference between the second quantity and the first quantity is less than or equal to a first threshold, and the first threshold is predefined or preconfigured.

6. The method according to claim 1, wherein the second quantity is a quantity of reference signals that corresponds to second evaluation time, and the second evaluation time is evaluation time for downlink transmission quality monitoring in a licensed spectrum.

7. The method according to claim 1, further comprising:
   determining the first evaluation time based on a quantity of available discontinuous reception periodicities, wherein all reference signals in the available discontinuous reception periodicities are available reference signals.

8. An apparatus for determining evaluation time for downlink transmission quality monitoring, comprising:
   at least one transceiver configured to receive first indication information from a network device, wherein the first indication information indicates channel occupancy time of the network device on a channel in an unlicensed spectrum; and
   at least one processor configured to:
      determine a first quantity based on the first indication information, wherein the first quantity is a quantity of available reference signals in first evaluation time; and
      determine the first evaluation time based on the first quantity and a second quantity, wherein the second quantity is an expected quantity of available reference signals in the first evaluation time, wherein each of the available reference signals satisfies at least one of the following:
         a moment of receiving the available reference signal is comprised in the channel occupancy time;
         a signal-to-noise ratio of the available reference signal is greater than a signal-to-noise ratio threshold; or
         a receive power of the available reference signal is greater than a receive power threshold; and
      wherein determining the first evaluation time based on the first quantity and the second quantity comprises:

extending the first evaluation time until the first quantity reaches the second quantity or the first evaluation time reaches an evaluation time threshold; or extending the first evaluation time until the first quantity reaches the second quantity or time by which the first evaluation time is extended reaches an extended time threshold.

9. The apparatus according to claim 8, wherein the first evaluation time is determined based on a difference between the second quantity and the first quantity and an expansion factor, and the expansion factor is predefined or preconfigured.

10. The apparatus according to claim 9, wherein an initial value of the first evaluation time is initial first evaluation time, and the initial first evaluation time is predefined or preconfigured.

11. The apparatus according to claim 9, wherein the first evaluation time is less than or equal to the evaluation time threshold, and the evaluation time threshold is predefined or preconfigured.

12. The apparatus according to claim 9, wherein the difference between the second quantity and the first quantity is less than or equal to a first threshold, and the first threshold is predefined or preconfigured.

13. The apparatus according to claim 8, wherein the second quantity is a quantity of reference signals that corresponds to second evaluation time, and the second evaluation time is evaluation time for downlink transmission quality monitoring in a licensed spectrum.

14. The apparatus according to claim 8, wherein the at least one processor is further configured to determine the first evaluation time based on a quantity of available discontinuous reception periodicities, wherein all reference signals in the available discontinuous reception periodicities are available reference signals.

15. A non-transitory computer-readable storage medium, wherein the non-transitory computer-readable storage medium comprises a computer program which, when executed by one or more processors, causes the one or more processors to perform operations comprising:

receiving first indication information from a network device, wherein the first indication information indicates channel occupancy time of the network device on a channel in an unlicensed spectrum;

determining a first quantity based on the first indication information, wherein the first quantity is a quantity of available reference signals in first evaluation time; and determining the first evaluation time based on the first quantity and a second quantity, wherein the second quantity is an expected quantity of available reference signals in the first evaluation time, wherein each of the available reference signals satisfies at least one of the following:

a moment of receiving the available reference signal is comprised in the channel occupancy time;

a signal-to-noise ratio of the available reference signal is greater than a signal-to-noise ratio threshold; or a receive power of the available reference signal is greater than a receive power threshold; and wherein determining the first evaluation time based on the first quantity and the second quantity comprises:

extending the first evaluation time until the first quantity reaches the second quantity or the first evaluation time reaches an evaluation time threshold; or extending the first evaluation time until the first quantity reaches the second quantity or time by which the first evaluation time is extended reaches an extended time threshold.

16. The non-transitory computer-readable storage medium according to claim 15, wherein the first evaluation time is determined based on a difference between the second quantity and the first quantity and an expansion factor, and the expansion factor is predefined or preconfigured.

17. The non-transitory computer-readable storage medium according to claim 16, wherein an initial value of the first evaluation time is initial first evaluation time, and the initial first evaluation time is predefined or preconfigured.

18. The non-transitory computer-readable storage medium according to claim 16, wherein the first evaluation time is less than or equal to the evaluation time threshold, and the evaluation time threshold is predefined or preconfigured.

19. The non-transitory computer-readable storage medium according to claim 16, wherein the difference between the second quantity and the first quantity is less than or equal to a first threshold, and the first threshold is predefined or preconfigured.

20. A chip, wherein the chip comprises at least one processor and a communication interface receiving programming instructions, and wherein the at least one processor executes the programming instructions to perform operations comprising:

receiving first indication information from a network device, wherein the first indication information indicates channel occupancy time of the network device on a channel in an unlicensed spectrum;

determining a first quantity based on the first indication information, wherein the first quantity is a quantity of available reference signals in first evaluation time; and determining the first evaluation time based on the first quantity and a second quantity, wherein the second quantity is an expected quantity of available reference signals in the first evaluation time, wherein each of the available reference signals satisfies at least one of the following:

a moment of receiving the available reference signal is comprised in the channel occupancy time;

a signal-to-noise ratio of the available reference signal is greater than a signal-to-noise ratio threshold; or a receive power of the available reference signal is greater than a receive power threshold; and wherein determining the first evaluation time based on the first quantity and the second quantity comprises:

extending the first evaluation time until the first quantity reaches the second quantity or the first evaluation time reaches an evaluation time threshold; or extending the first evaluation time until the first quantity reaches the second quantity or time by which the first evaluation time is extended reaches an extended time threshold.

* * * * *